(12) United States Patent
Dunwoody et al.

(10) Patent No.: US 8,788,408 B2
(45) Date of Patent: Jul. 22, 2014

(54) ITEM-SPECIFIC MONEY TRANSFER METHODS AND SYSTEMS

(75) Inventors: Kimberly Dunwoody, Parker, CO (US); Scott Paintin, Littleton, CO (US)

(73) Assignee: The Western Union Company, Englewood, CO (US)

( * ) Notice: Subject to any disclaimer, the term of this patent is extended or adjusted under 35 U.S.C. 154(b) by 407 days.

(21) Appl. No.: 12/750,621

(22) Filed: Mar. 30, 2010

(65) Prior Publication Data
US 2011/0246328 A1    Oct. 6, 2011

(51) Int. Cl.
*G06Q 40/00* (2012.01)
(52) U.S. Cl.
USPC .......................................................... 705/39
(58) Field of Classification Search
USPC ..................................................... 705/35–45
See application file for complete search history.

(56) References Cited

U.S. PATENT DOCUMENTS

| | | | | |
|---|---|---|---|---|
| 6,076,070 A * | 6/2000 | Stack | | 705/20 |
| 2001/0038033 A1* | 11/2001 | Habib | | 235/375 |
| 2001/0047310 A1* | 11/2001 | Russell | | 705/26 |
| 2002/0126780 A1* | 9/2002 | Oshima et al. | | 375/347 |
| 2002/0178013 A1* | 11/2002 | Hoffman et al. | | 705/1 |
| 2004/0172260 A1* | 9/2004 | Junger et al. | | 705/1 |
| 2004/0205023 A1 | 10/2004 | Hafer et al. | | |
| 2005/0131836 A1* | 6/2005 | Armstrong et al. | | 705/64 |
| 2005/0197919 A1* | 9/2005 | Robertson | | 705/26 |
| 2007/0203836 A1* | 8/2007 | Dodin | | 705/44 |
| 2008/0249937 A1* | 10/2008 | Walls et al. | | 705/43 |
| 2009/0094260 A1* | 4/2009 | Cheng et al. | | 707/100 |
| 2010/0042517 A1 | 2/2010 | Paintin et al. | | |
| 2010/0049631 A1* | 2/2010 | Goldman | | 705/27 |

\* cited by examiner

*Primary Examiner* — Robert R Niquette
*Assistant Examiner* — Chia Yi Liu
(74) *Attorney, Agent, or Firm* — Kilpatrick Townsend & Stockton LLP

(57) ABSTRACT

The invention provides various systems and methods for implementing item-specific money transfers. The method includes receiving identification of an item, determining a vendor and a price of the item, and receiving, from a receiver, a money transfer request for an amount of the price of the item. The money transfer request identifies a sender. The method further includes sending the money transfer request to the sender, receiving, from the sender, authorization for a money transfer in an amount of the price of the item. The authorization includes an indication that funds from the money transfer are restricted for use only for the item.

13 Claims, 8 Drawing Sheets

ITEM-SPECIFIC MONEY TRANSFER METHODS AND SYSTEMS

FIELD OF THE INVENTION

The present invention relates, in general, to money transfers, and more particularly, to item-specific money transfers.

BACKGROUND OF THE INVENTION

Currently, the process of transferring money is complicated and not user-friendly. There are a number of forms and processes that must be completed prior to completing a money transfer. Furthermore, when a person sends money to another person, he or she is often unsure of exactly how the money has been spent, if the item is being purchased at the best price available, and to prevent fraudulent transactions. Accordingly, improvements in the art are needed.

BRIEF SUMMARY OF THE INVENTION

The present invention provides a method for implementing item-specific money transfers. The method includes receiving, by a money transfer processing system, identification of an item, determining, by the money transfer processing system, a vendor and a price of the item, receiving, by the money transfer processing system, from a receiver, a money transfer request for an amount of the price of the item. The money transfer request identifies a sender. The method further includes sending, by the money transfer processing system, the money transfer request to the sender, and receiving, by the money transfer processing system, from the sender, authorization for a money transfer in an amount of the price of the item. The authorization includes an indication that funds from the money transfer are restricted for use only for the item. Further, the method includes pre-staging, by the money transfer processing system, the money transfer, binding, by the money transfer processing system, the funds of the money transfer to only be available for payment to the vendor for the item, and sending, by the money transfer processing system, to the vender of the item, the money transfer for payment of the item.

A further embodiment of the present invention provides for a method of generating an item-specific money transfer identifier. The method includes receiving, by a money transfer system, from a first sender of a plurality of senders, identification of an item for purchase, a geographical location of the item, and a money transfer request for an amount of the item. The method further includes pre-staging, by the money transfer system, a money transfer for the amount of the item, and generating, by the money transfer system, an identifier for the money transfer. The identifier comprises an item identifier identifying the item, a location identifier identifying the geographical location, and a first funding identifier. The method further includes securely sending the identifier to a receiver, receiving, by the money transfer system, from the receiver, the identifier, and in response to receiving the identifier from the receiver, providing the receiver with funds from the money transfer.

A further embodiment of the present invention provides for a machine-readable medium for implementing item-specific money transfers. The machine-readable medium includes instructions for receiving, by a money transfer processing system, identification of an item, determining, by the money transfer processing system, a vendor and a price of the item, receiving, by the money transfer processing system, from a receiver, a money transfer request for an amount of the price of the item. The money transfer request identifies a sender. The machine-readable medium further includes instructions for sending, by the money transfer processing system, the money transfer request to the sender, and receiving, by the money transfer processing system, from the sender, authorization for a money transfer in an amount of the price of the item. The authorization includes an indication that funds from the money transfer are restricted for use only for the item. Further, the machine-readable medium includes instructions for pre-staging, by the money transfer processing system, the money transfer, binding, by the money transfer processing system, the funds of the money transfer to only be available for payment to the vendor for the item, and sending, by the money transfer processing system, to the vender of the item, the money transfer for payment of the item.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Aspects of the present invention relate to senders being able to be certain of how a receiver uses funds transferred to the receiver from the sender, to a biller from a sender, etc. If the receiver, for example, has a problem spending the money on the intended item, it could be difficult to know if the receiver actually used the money that he or she received in the way it was intended. As such, embodiments of this invention would allow the receiver to send a short message service (SMS) or an email of a picture of the item he or she purchased or proof of purchase (e.g., a money order for rent or a receipt for an appliance, etc.), or desires to purchase.

In one embodiment, the sender may send a money transfer along with an SMS or email that specifies what the money was to be used for. The message would be sent to the receiver and reminders would continue to be sent the receiver until proof of purchase has been sent to the sender. Once the receiver has made the purchase, he or she could then take a photo of the item purchased and send the photo in a message. Accordingly, the sender knows that the money was used to purchase the intended item.

Further aspects of the present invention allow for the sender to bind a money transfer to a specific item, such that the money could not be used for any purpose other than to purchase the bound item. Furthermore, aspects of the present invention may provide comparison shopping for the specific item in conjunction with the money transfer.

Figure 1:
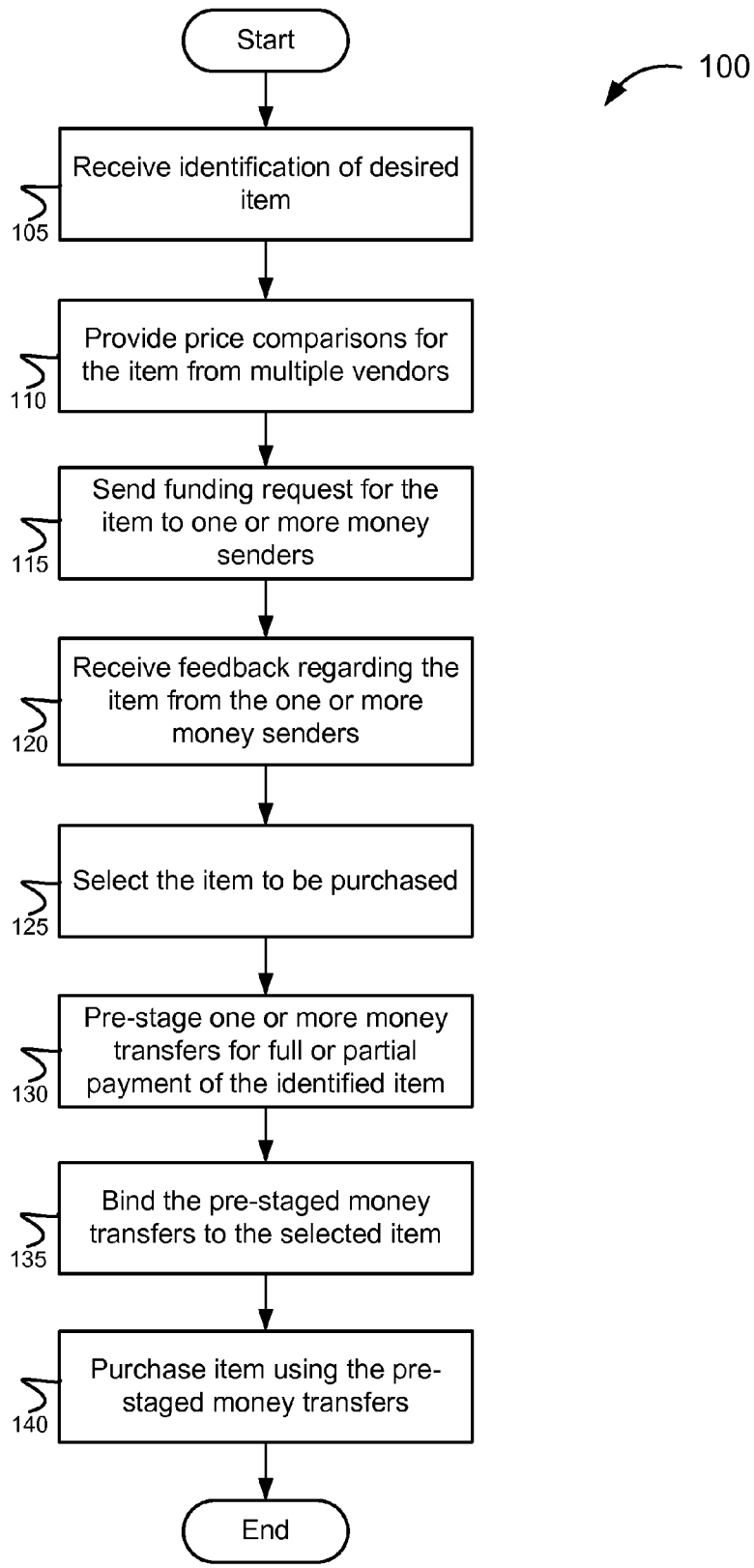
FIG. 1 is a flow diagram illustrating a method of implementing item-specific money transfers, according to one embodiment of the present invention.

Turning now to FIG. 1, a flow diagram which illustrates a method 100 of implementing item-specific money transfers. At process block 105, identification (or selection) of an item or items may be received at a money transfer (or other) processing system. Multiple items may be identified/selected (e.g., a grocery list) for a single money transfer earmarked for multiple items. The selected item may be, for example, a consumer good, a charitable donation, a service, or the like. The selection of the item may be made through a mobile device, a web interface, at a kiosk, at an agent location of the money transfer processor, etc. In one embodiment, the item may be identified by taking a photograph of the item and providing the photograph to a recognition program used to identify the item. Alternatively, an identifier for the item may be scanned (e.g., by barcode, RFID, near-field communication, etc.) in order for the item to be identified. In one embodiment, near-field communication (NFC) may by a short-range high frequency wireless communication technology which enables the exchange of data between devices over approximately a 10 centimeter (i.e., around 4 inches) distance. Further, the identification for the item may be entered into an interface. In one embodiment, if, for example, the photograph of the item fails to identify a specific item, then comparable items may instead be presented to the user.

At process block 110, price comparisons may be provided for the item from one or more vendors. For example, a user may initially select a refrigerator made by vendor X, based on the identifier for the refrigerator (e.g., the universal pricing code (UPC), International Standard Book Number (ISBN), European Article Number (EAN), etc.) and a search of vendors selling the same refrigerator with the same identifier may be conducted. A vendor may pay a fee to be included in the search results and/or for placement (e.g., first shown) in the search results. The results of the search, including, for example, the vendor (sometimes referred to as the merchant), the price, etc. may then be displayed to the user and/or to the sender.

In one embodiment, multiple users and/or persons, from which the user may request funding for the items, may have access to the comparison display of items. As such, at process block 115, feedback and/or suggestions from the users and potential funders may be received regarding the items displayed. Further, the users and potential funders may also be able to provide additional possible vendors and/or items which were not found in the search. As such, the users and funders have control and input in the decision making process as to which item(s) to be selected from which vendor(s). Accordingly, the desired item(s) may be selected (process block 120). For example, if a college student is asking his or her parent to fund a laptop computer, the student may take a picture of the laptop he or she desires and through an interface (e.g., a web interface), the parent and the student can compare the same and/or different laptops from various vendors until a laptop is agreed upon.

Accordingly, at process block 125, a money transfer request accompanied by identification of the selected item may be sent to the money transfer processing system and then to one or more money transfer senders and/or funders. In other words, the receiver may request that one or more funders send money to fund the selected item. In response to one or more of the funders accepting the money transfer request and initiating a money transfer to fund at least a portion of the selected item, one or more money transfers may be pre-staged for full or partial payment of the selected item (process block 130). Further, the one or more funders may accept a portion of a money transfer request to fund multiple items (e.g., a parent may fund the purchase of bread and milk from a grocery store list, but not fund cigarettes).

Furthermore, the pre-staged money transfer may be bound (or restricted for use) only to purchase the selected item (process block 135) or available to purchase any item except a restricted item. For example, if the receiver were to receive the funds from the money transfer without any restriction, the receiver may have indicated to the funder that the funds were going to be used to purchase the selected item; however, once the funds have been received by the receiver, there would not be a mechanism to ensure that the funds were actually used to purchase the selected item. For example, the receiver may have a gambling problem, and in the past has used funds from money transfers to gamble as opposed to purchase a needed item. Therefore, in one embodiment, the pre-staged money transfer may be bound to the selected item such that the funds can only be used to purchase the selected item or to purchase any item other than a restricted item.

For example, the funds from the money transfer may be bound by the item's UPC or the like, or the funds may be transferred directly to the vendor of the selected item, and can only be used to purchase the selected item from the specified vendor. Furthermore, a return restriction may be placed on the item. For example, the receiver may be restricted from simply purchasing the item and then returning the item for a refund or store credit. Instead, the receiver may only be allowed to exchange the item for the same or a similar item or send the funds back to the funder (or sender). A fee may apply to sending funds back to the funder (or sender). Accordingly, the funder (or sender) can be satisfied that the funds are used for the selected item.

Figure 2:
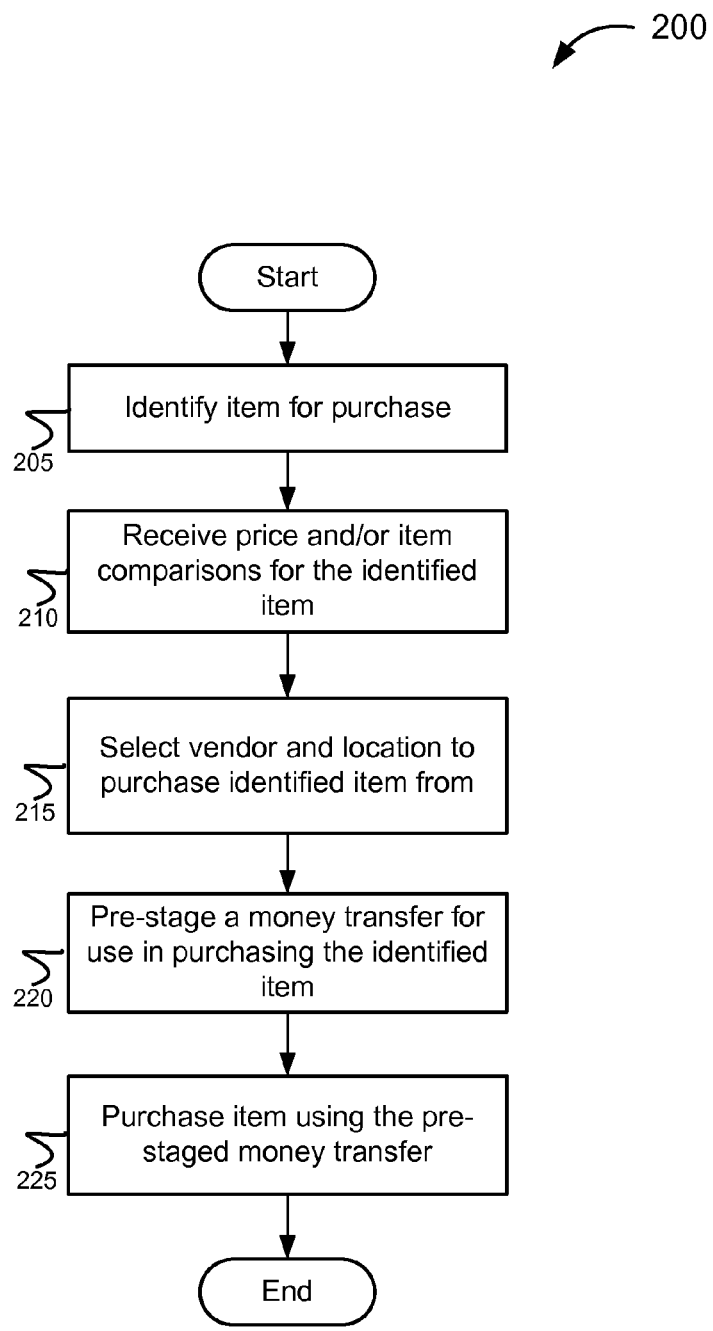
FIG. 2 is a flow diagram illustrating a method of implementing item-specific money transfers and comparative shopping, according to one embodiment of the present invention.

At process block 140, the item may be purchased using the funds from the money transfer. Furthermore, the funds may be sent directly to the vendor, may be placed on a stored value card, gift card, etc. The funds may also be placed on a voucher or the like. In an alternative embodiment, FIG. 2 illustrates a method 200 of implementing item-specific money transfers with comparative/collaborative shopping. At process block 205, the item (or items) for purchase may be identified. At process block 210, price comparisons for the selected item may be received. These comparison prices may be specific to a vendor, location, etc. For example, vendor A may provide the item at a first price and vendor B may provide the item at a second price. Alternatively, vendor A may provide the item at a first price at a first location, and a second price at a second location, and so forth. As such, the lowest price for an item may ultimately depend on the vendor and/or the location.

Furthermore, comparable (or similar) items may be presented. For example, other brands or other models of the same item may be presented, or substitute items may be presented (e,g, lemon for sailt, margarine for butter, natural gas for petroleum, etc.). As such, the customer may be able to compare prices by item type, in order to get the best price. Accordingly, at process block 215, a vendor and an accompanying location may be selected. It should be noted that the "location" may be on-line or virtual, as opposed to a physical store location. During this comparative/collaborative shopping process, not only the customer who is requesting funds, but the sender(s) of the funds can be involved in the decision making process. The sender(s) may also be the only one(s) involved in the process. One or more merchants/organizations may also be involved. For example, merchant(s) may be willing to negotiate a price for the item(s) or substitute(s) (e.g., competitive bidding). Likewise, organizations, like charities, may be willing to negotiate on which cause(s) may be benefited by a donation and/or the percent or amount that will go to the benefit of the cause(s).

For example, the receiver may be in Mexico and the sender may be in Colorado. The receiver may be requesting from the sender money to purchase a refrigerator. The receiver may have identified a refrigerator in Mexico at a first price, and sends the sender a request for the amount of the identified refrigerator; however, the sender may have located a better price for the refrigerator in Colorado (even with the added shipping costs). Therefore, the sender could suggest (or require) that the money be used to purchase the refrigerator in Colorado as opposed the refrigerator in Mexico. Similarly, the sender may have found a better price elsewhere in Mexico (e.g., another city, merchant and/or location).

Furthermore, once the item, vendor, and location have been determined, a money transfer may be pre-staged (process block 220). In one embodiment, the money transfer may be restricted for use only to purchase the selected item(s). A further restriction may be included which does not allow the item(s) to be returned for universal store credit or cash. For example, if the item is returned, then the funds may revert back to the sender. The sender may be notified (e.g., by SMS text message, e-mail, telephone call, etc.) of the return so he/she can pick up the reverted funds at a location or the funds may be credited to an account of the sender or returned by negotiable instrument. Alternatively, the item may only be able to be exchanged, or the funds may only be able to be used in the same department as the item. Accordingly, the sender can be assured that the funds are properly used for their intended purpose. Hence, at process block 225, the pre-staged money transfer may be used to purchase the selected item. A pre-staged money transfer may involve generating a password, PIN, and/or transaction umber (e.g., by the sender, receiver, merchant, organization, host computer, point of sale device, etc.) for use by the receiver to purchase the item(s). The password, PIN, and/or transaction number each may be determined, in part, by one or more of the sender, receiver, merchant, organization, host computer, point of sale device, etc., or may be determined, in whole or in part, by an identifier associated with the item(s) (e.g., VPC).

Figure 3:
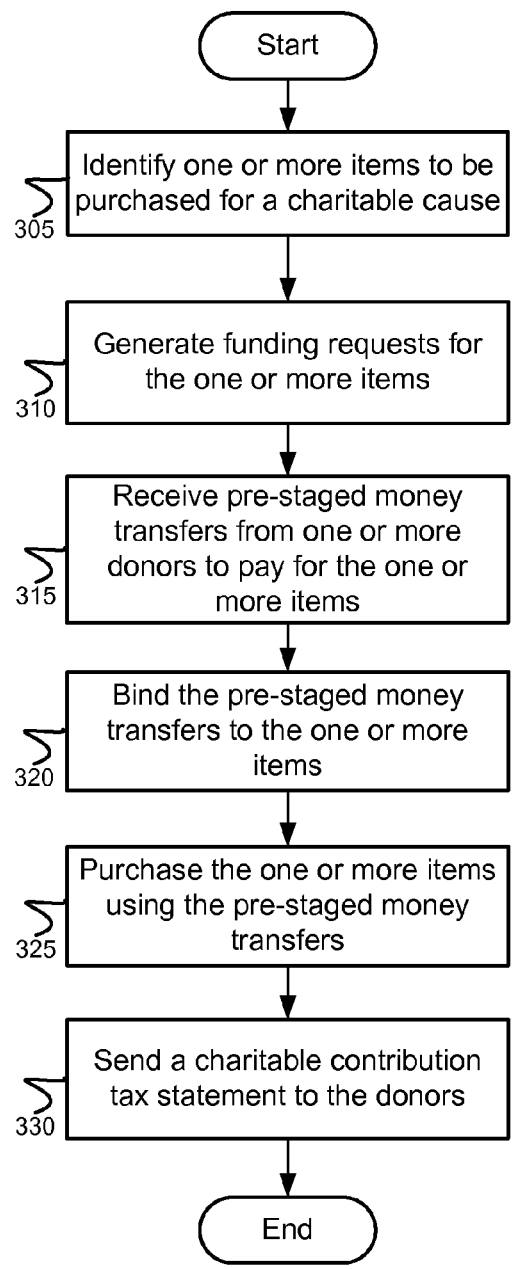
FIG. 3 is a flow diagram illustrating a method of implementing money transfers for specific items for charitable donations, according to one embodiment of the present invention.

Referring next to FIG. 3, which illustrates a method 300 of implementing money transfers for specific items for charitable donations. At process block 305, a charitable item may be identified. For example, a charitable organization may identify a large number of items (e.g., 1000 bottles of water) for relief in a disaster area. In order to purchase the item(s) the charitable organization may need a number of smaller donations from a number of different senders. Accordingly, funding requests may be generated and sent out to a number of potential senders (process block 310) (e.g., by text message, e-mail, telephone call, direct mail, advertisements, etc.).

At process block 315, in response to the funding requests, pre-staged money transfers from donors may be received to pay for the item(s). These pre-staged money transfers may be for any portion of the total amount, and also may include a restriction which indicates that the funds are only to be used for the specified charitable item(s) or other charitable purposes. As such, at process block 320, the money transfers may be bound to the item(s) and/or purposes, so that the funds would not be available unless they were used to purchase the charitable items and/or used for such purposes. Also, a cash refund for the charitable items could be prohibited.

At process block 325, the item(s) may be purchased using the pre-staged money transfers. Furthermore, a charitable contribution tax statement (or similar document) may be sent to the donors (process block 330). Alternatively, the information may be directly downloaded into a tax and financial tracking software system.

Figure 4:
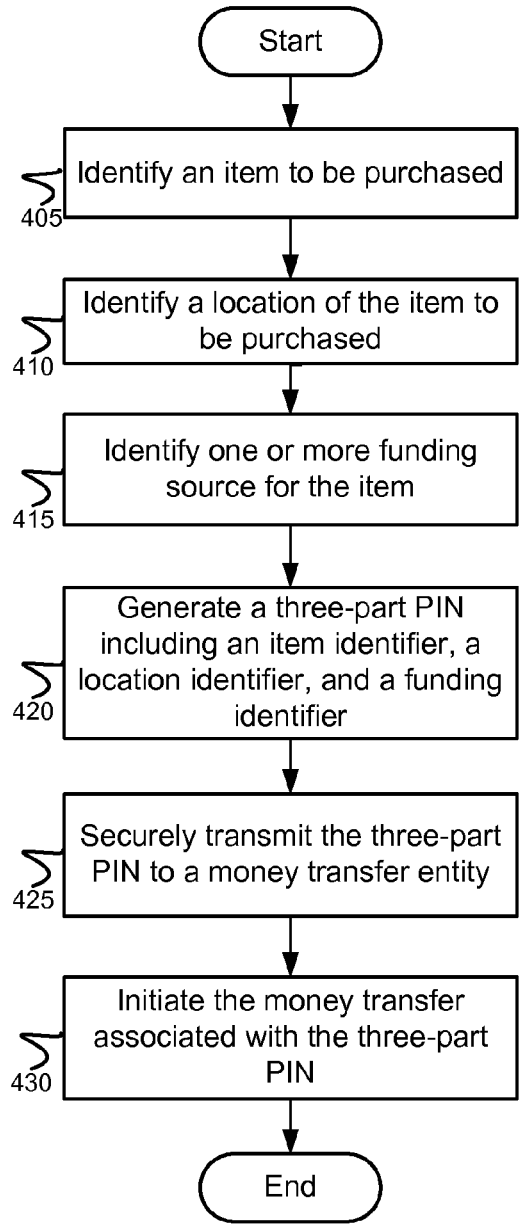
FIG. 4 is a flow diagram illustrating a method of implementing item-specific and location-specific PIN generation, according to one embodiment of the present invention.

Turning next to FIG. 4, which illustrates a method 400 of implementing item and/or location specific PIN generation. At process block 405, an item to be purchased may be identified. The identification process may occur in a same or similar way of that of FIGS. 1-3. Furthermore, an item identifier (e.g., a barcode, a UPC, etc.) may be associated with the item. At process block 410, the location of the item may be identified. This may be the physical location of the item, the physical location of the vendor selling the item, a virtual or web-based location, etc.

At process block 415, one or more funding sources may be identified. For example, money transfer, mobile wallet(s), bank account(s), credit card(s), debit card(s), gift card(s), cash, investment account(s), check(s), money order(s), etc. may be identified for use in payment for the item. There may be many payments and payment types from many sources used to pay for the item. In one embodiment, using the item identifier, an identifier for the location, and identifiers for the funding sources, a three-part PIN, password, or transaction identifier may be generated (process block 420). The PIN, password, or transaction identifier may also be one- or two-part based on the criteria above.

In one embodiment, the receiver's location may be tracked and a determination may be made whether the location identifier and the receiver's location match. Tracking the receiver's location may be done where the PIN is used and/or by GPS. For example, if the location identifier was for Denver, Colo., and when the receiver attempted to use the PIN he or she was in Sacramento, Calif., the receiver would be denied the funds, and an alert may be generated. Alternatively, the location identifier may restrict purchase of the item to a vendor location or general location. At process block 425, the PIN and/or receiver's location may be securely transmitted to a money transfer entity for fund retrieval. For example, the location identifier may be used to prevent fraudulent transactions. If the owner of the PIN is scheduled to be at location A and the funds associated with the PIN are attempted to be used at location B, a hold or alarm may be generated. Additionally, biometric information (fingerprint, retinal scan, etc.) or facial recognition information may be used in conjunction with the location information. For example, not only does the location of the PIN holder need to match the location identifier, but also biometric information from the PIN holder must match the rightful owner of the PIN.

Prior to the funds being disbursed to the receiver and/or vendor/merchant, a biometric scan, current location information, and the PIN may be transmitted to the money transfer entity. The transmission may be a near-field or similar transmission. Alternatively or in addition, after the PIN has been transmitted, the receiver may be required to photograph himself or herself and transmit the picture to the money transfer entity within a certain time after the transmission of the PIN, in order to verify the receiver's identity. He or she may also be required to be holding the purchased item in the photograph, which may then be sent to the sender. Alternatively or in addition, the receiver may also be required to photograph a bar code and/or UPC on the item and/or photograph the receipt and/or bar code on the receipt.

Furthermore, the item identifier may be configured to indicate that the funds associated with the PIN are to be restricted for use only for purchasing the item identified by the item identifier. Also, the PIN provides for the ability to tie multiple funding sources to the same item. For example, a receiver may have three relatives each contributing to the cost of the item, and so all three funding source identifiers may be associated with the PIN. As such, at process block 430, the fund(s) associated with the PIN may then be used to purchase the item identified by the item identifier.

Figure 5:
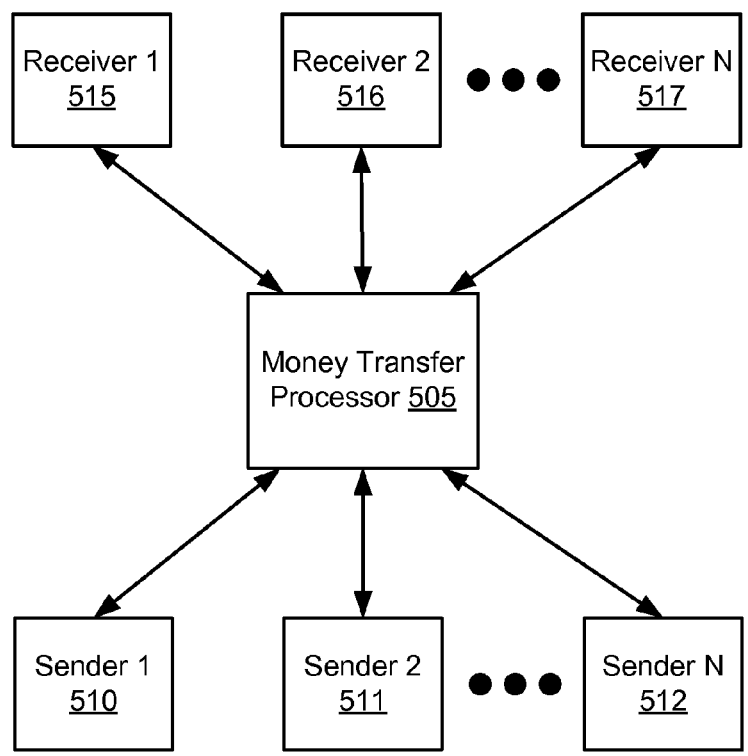
FIG. 5 is a block diagram illustrating a system for implementing item-specific money transfers, according to one embodiment of the present invention.

FIG. 5 illustrates a system 500 for implementing item-specific money transfers. In one embodiment, system 500 may include money transfer processor 505. In one embodiment, money transfer processor 505 may be configured to implement the methods described in FIGS. 1-4. System 500 may further include senders 1-N 510, 511, and 512, and receivers 1-N 515, 516, and 517. Accordingly, any number of receivers may be sent funds from any number of senders. Further, senders 510, 511, and 512 may be involved in the item determination and fund binding process, as well as receivers 515, 516, and 516 and/or merchants/organizations. Therefore, any number of senders, receivers, and/or merchants/organizations may be involved in the collaborative shopping aspect of the present invention. Furthermore, money transfer processor 505 is configured to facilitate the generation of the money transfers as well as the presentation of information used for the collaborative shopping.

Figure 6:
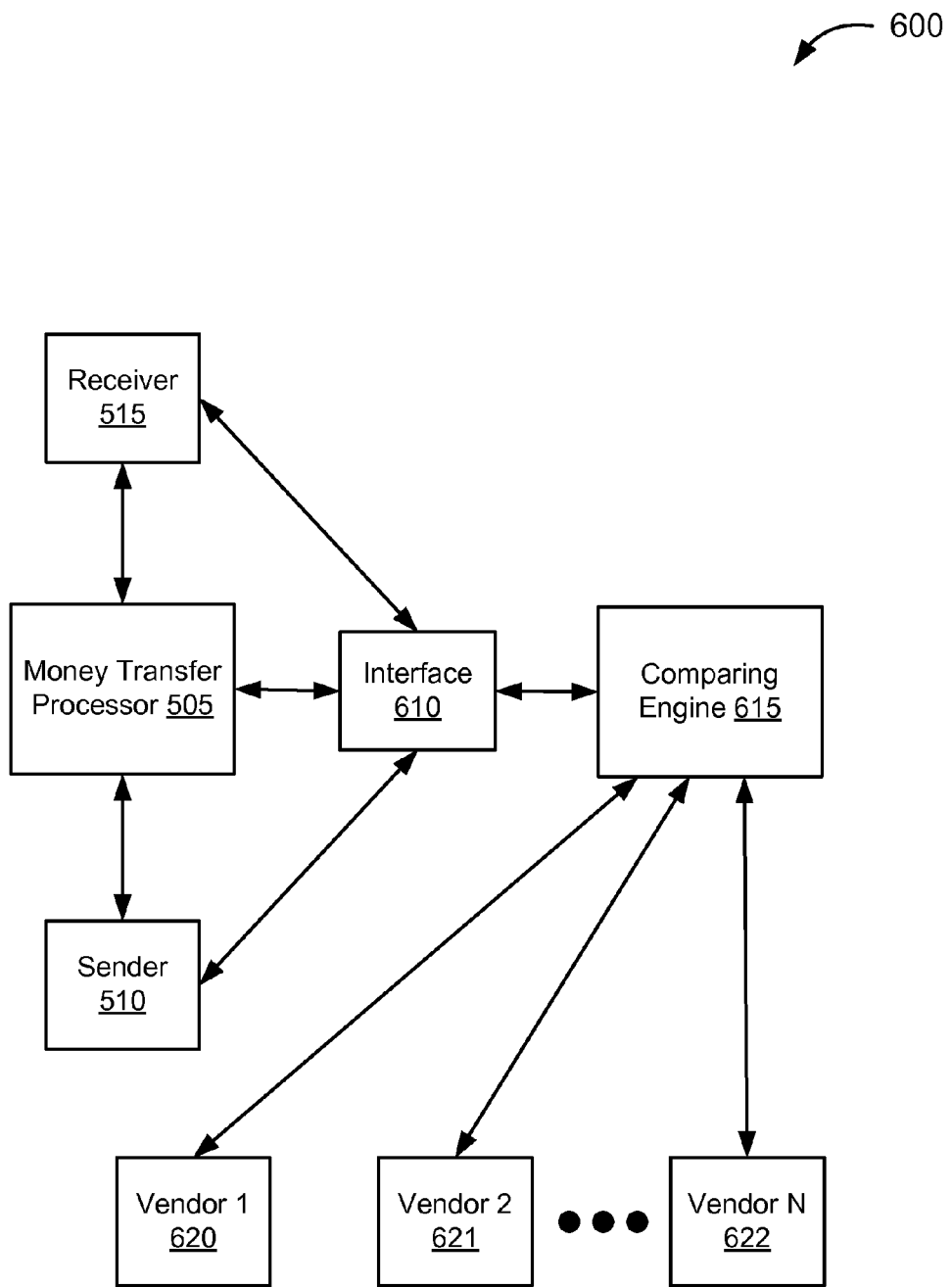
FIG. 6 is a block diagram illustrating a system for implementing item-specific money transfers and comparative shopping, according to one embodiment of the present invention.

Referring next to FIG. 6, which illustrates a system 600 for implementing item-specific money transfers and comparative shopping, according to a further embodiment of the present invention. In one embodiment, system 600 may additionally include an interface 610. Interface 610 may be, for example, a web interface, a kiosk, a point-of-sale (POS), etc. Interface 610 may be configured to provide a display and/or input for displaying and selecting items.

System 600 may further include comparing engine 615 in communication with interface 610. Comparing engine 615 may further be in communication with vendors 1-N 620, 621, 622. As such, comparing engine 610 may be configured to receive an item selection or identification from interface 610 and then access vendors 620, 621, and 622 to receive price and location comparisons from the vendors, as well as alternative items. Accordingly, the comparative shopping between sender(s) 510, receiver(s) 515 and/or merchants/organizations may be completed (see FIGS. 1-3).

Figure 7:
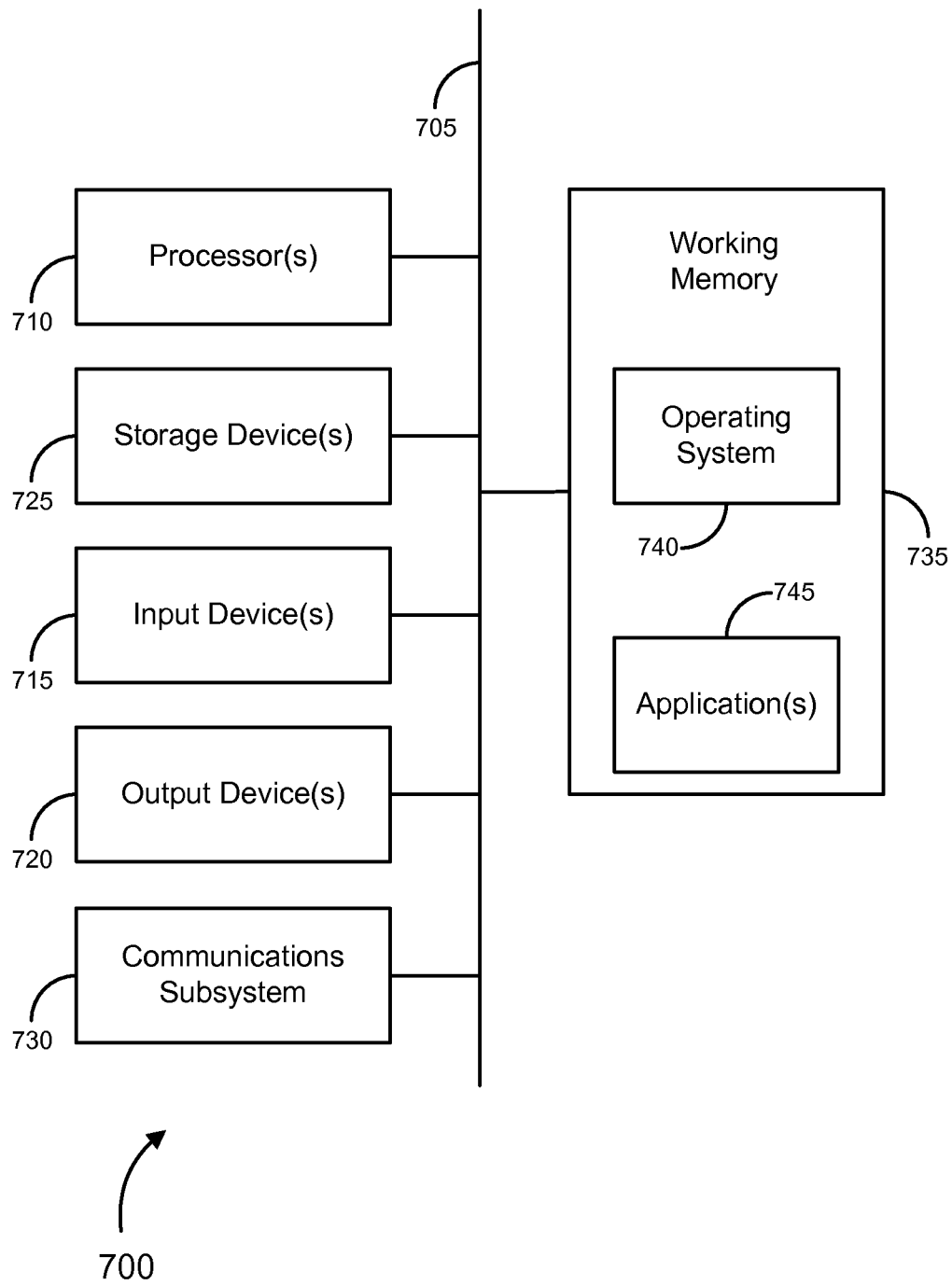
FIG. 7 is a generalized schematic diagram illustrating a computer system, in accordance with various embodiments of the invention.

FIG. 7 provides a schematic illustration of one embodiment of a computer system 700 that can perform the methods of the invention, as described herein, and/or can function as, for example, money transfer processor 505 (FIGS. 5 and 6), comparing engine 615 (FIG. 6), etc. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements can include one or more processors 710, including, without limitation, one or more general purpose processors and/or one or more special purpose processors (such as digital signal processing chips, graphics acceleration chips, and/or the like); one or more input devices 715, which can include, without limitation, a mouse, a numeric keypad, a keyboard, a touch screen, and/or the like; and one or more output devices 720, which can include, without limitation, a display device, a printer, a sound card and/or the like.

The computer system 700 may further include (and/or be in communication with) one or more storage devices 725, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, mesh network, etc.), and/or the like. The device may be a web-enabled Smartphone, or the like. The communications subsystem 730 may permit data to be exchanged with a network (such as the network described below, to name one example), and/or any other devices described herein. In many embodiments, the computer system 700 will further comprise a working memory 735, which can include a RAM or ROM device, as described above.

The computer system 700 can also comprise software elements, shown as being currently located within the working memory 735, including an operating system 740 and/or other code, such as one or more application programs 745 or Application Programming Interfaces (APIs), which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 725 described above. In some cases, the storage medium might be incorporated within a computer system, such as the system 700. In other embodiments, the storage medium might be separate from a computer system (e.g., a removable medium, such as a compact disc, etc.), and/or provided in an installation package, such that the storage medium can be used to program a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 700) to perform methods of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another machine-readable medium, such as one or more of the storage device(s) 725. Merely by way of example, execution of the sequences of instructions contained in the working memory 735 might cause the processor(s) 710 to perform one or more procedures of the methods described herein.

The terms "machine-readable medium" and "computer-readable medium", as used herein, refer to any medium that participates in providing data that causes a machine to operate in a specific fashion. In an embodiment implemented using the computer system 700, various machine-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 725. Volatile media includes, without limitation, dynamic memory, such as the working memory 735. Transmission media includes coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc., carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
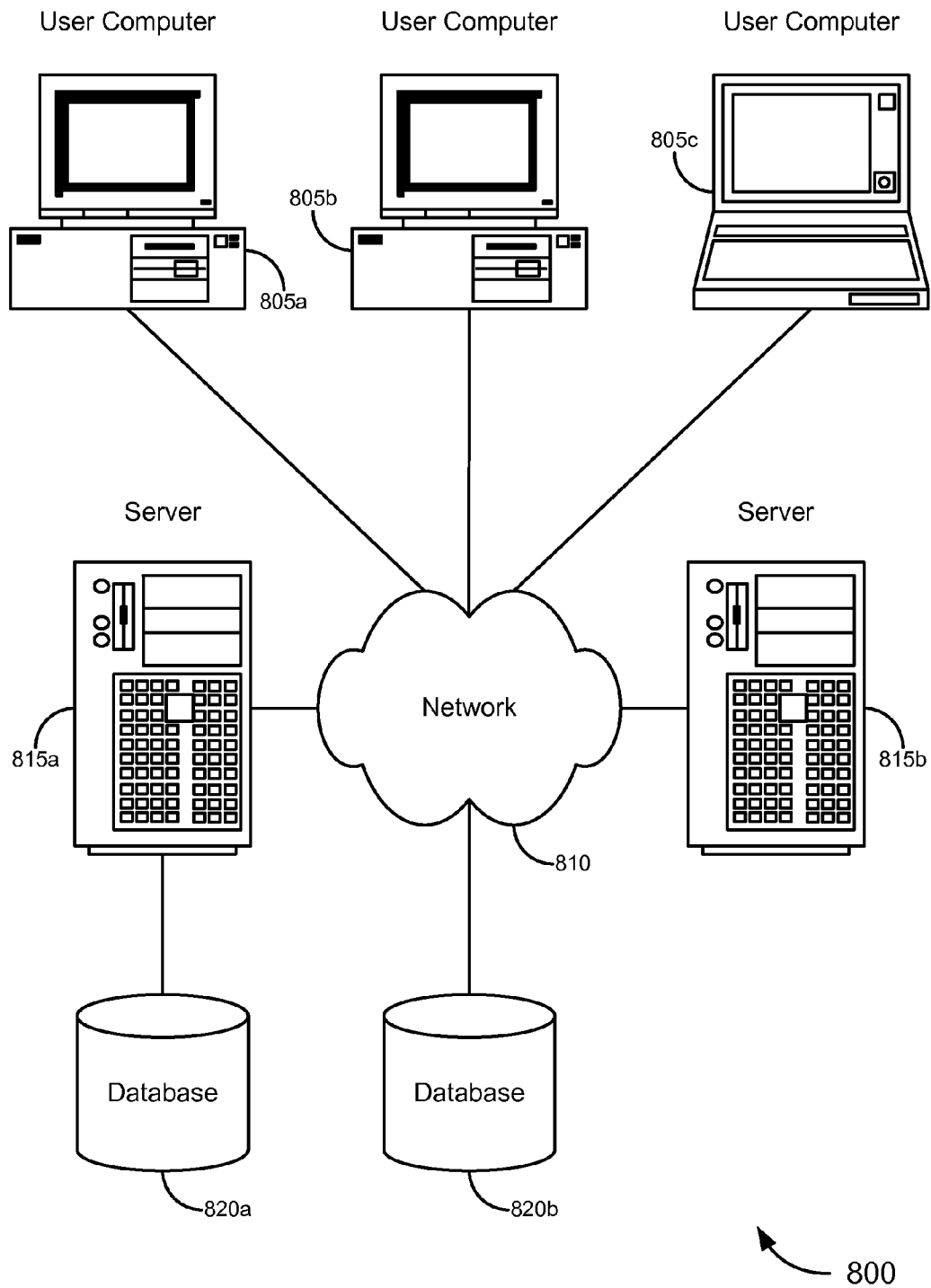
FIG. 8 is a block diagram illustrating a networked system of computers, which can be used in accordance with various embodiments of the invention.

A set of embodiments comprises systems for implementing item-specific money transfers. Merely by way of example, FIG. 8 illustrates a schematic diagram of a system 800 that can be used in accordance with one set of embodiments. The system 800 can include one or more user computers 805. The user computers 805 can be general purpose personal computers (including, merely by way of example, personal computers and/or laptop computers running any appropriate flavor of Microsoft Corp.'s Windows™ (e.g., Vista™) and/or Apple Corp.'s Macintosh™ operating systems) and/or workstation computers running any of a variety of commercially available UNIX™ or UNIX-like operating systems. These user computers 805 can also have any of a variety of applications, including one or more applications configured to perform methods of the invention, as well as one or more office applications, database client and/or server applications, and/or web browser applications. Alternatively, the user computers 805 can be any other electronic device, such as a thin-client computer, cellular telephone, Internet-enabled mobile telephone, and/or personal digital assistant (PDA), capable of communicating via a network (e.g., the network 810 described below) and/or displaying and/or navigating web pages or other types of electronic documents. Although the exemplary system 800 is shown with three user computers 805, any number of user computers can be supported.

Certain embodiments of the invention may operate in a networked environment, which can include a network 810. The network 810 can be any type of network familiar to those skilled in the art that can support data communications using any of a variety of commercially available protocols, including without limitation TCP/IP, SNA, IPX, AppleTalk, and the like. Merely by way of example, the network 810 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, mesh network, Code Division Multiple Access (CDMA), Time Division Multiple Access (TDMA), Global System for Mobile communications (GSM), General Packet Radio Service (GPRS), the Bluetooth™ protocol known in the art, and/or any other wireless protocol; and/or any combination of these and/or other networks.

Embodiments of the invention can include one or more server computers 815 or mainframe computers. Each of the server computers 815 may be configured with an operating system, including without limitation any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 may be a web server, which can be used, merely by way of example, to process requests for web pages or other electronic documents from user computers 805. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 805 to perform methods of the invention.

The server computers 815, in some embodiments, might include one or more application servers, which can include one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 805 and/or another server 815. In some embodiments, an application server can create web pages dynamically for displaying the information in accordance with embodiments of the invention, such as interface 610 (FIG. 6). Data provided by an application server may be formatted as web pages (comprising HTML, Javascript, WML, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement methods of the invention incorporated by an application running on a user computer 805 and/or another server 815. Alternatively, as those skilled in the art will appreciate, a file server can include all necessary files, allowing such an application to be invoked remotely by a user computer 805 and/or server 815. It should be noted that the functions described with respect to various servers herein (e.g., application server, database server, web server, file server, etc.) can be performed by a single server or mainframe computer and/or a plurality of specialized servers or mainframe computers, depending on implementation-specific needs and parameters.

In certain embodiments, the system can include one or more databases 820. The location of the database(s) 820 is discretionary: merely by way of example, a database 820a might reside on a storage medium local to (and/or resident in) a server 815a (and/or a user computer 805). Alternatively, a database 820b can be remote from any or all of the computers 805, 815, so long as the database can be in communication (e.g., via the network 810) with one or more of these. In a particular set of embodiments, a database 820 can reside in a storage-area network ("SAN") familiar to those skilled in the art. (Likewise, any necessary files for performing the functions attributed to the computers 805, 815 can be stored locally on the respective computer and/or remotely, as appropriate.) In one set of embodiments, the database 820 can be a relational database, such as an Oracle™ database, that is adapted to store, update, and retrieve data in response to SQL-formatted commands. The database might be controlled and/or maintained by a database server, as described above, for example.

In a further embodiment, a transaction system which includes a loyalty host to administer the loyalty programs may be provided. In some instances, the loyalty host may be a component of the one or more machines included in the transaction system performing other functions. Alternatively, the loyalty host may be a standalone system receiving transaction details from another component of the transaction system. The loyalty host may be used to automatically enroll customers in a loyalty program. Loyalty systems and methods are more fully described in Universal Loyalty Systems and Methods, U.S. patent application Ser. No. 12/190,348, filed on Aug. 12, 2008, and Money Transfer Convenience Card, Systems and Methods, U.S. patent application Ser. No. 10/687,575, filed on Oct. 15, 2003, the complete disclosures of which are hereby incorporated by reference.

In one embodiment, an agent may offer services to perform money transfer transactions. The customer may initiate a money transfer transaction by walking into an agent location and providing details of the money transfer transaction to an agent clerk. Money transfer transaction details may include recipient information, money transfer amount, and/or information about the customer (sender), such as a telephone number. The agent clerk may enter the details into a POS device. When all the details have been entered, the POS device may transmit the transaction information to a transaction host for processing. Alternatively, the customer may stage or initiate a money transfer transaction at a kiosk or other user input device. The customer may also stage or initiate a money transfer transaction over the telephone of the Internet While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing item-specific money transfers, the method comprising:
 receiving, by a money transfer computer processor, identifiers of an item, wherein the identifiers of the item is a barcode and a photograph of the item;
 determining, by the money transfer computer processor, at least one vendor and at least one price of the item or a substitute for the item;
 receiving, by the money transfer computer processor, from a receiver, a money transfer request for an amount of the price of the item or a substitute for the item, wherein the money transfer request identifies a sender;
 sending, by the money transfer computer processor, the money transfer request to the sender;
 receiving, by the money transfer computer processor, from the sender, authorization for a money transfer in an amount of the price of the item or a substitute for the item, wherein the authorization includes an indication that funds from the money transfer are restricted for use only for the item or a substitute for the item, and wherein the authorization further includes one or more return restrictions associated with the item or substitute item;
 pre-staging, by the money transfer computer processor, the money transfer;
 binding, by the money transfer computer processor, the funds of the money transfer to the item using the identifiers of the item, wherein the binging includes:
  associating the identifiers including the barcode of the item and the photograph of the item with the funds of the money transfer,
  generating a personal identification number (PIN) associated with the funds of the money transfer,
 providing access to the funds of the money transfer using the PIN which is bound to the funds of the money transfer, and
  based on the barcode of the item and the photograph of the item and by using the PIN, restricting the funds from the money transfer to only be used for payment to the vendor for the item or a predetermined substitute for the item;
 providing the identifiers and the PIN to the vendor of the item; and
 in response to the providing of the identifiers and the PIN to the vendor, releasing, by the money transfer computer processor, to the vender of the item or a substitute for the item, the funds of the money transfer for payment of the item or the predetermined substitute for the item.

2. A method of implementing item-specific money transfers as in claim 1, wherein the interface comprises a kiosk.

3. A method of implementing item-specific money transfers as in claim 1, further comprising:
 sending a photograph of the item or a substitute for the item to the money transfer computer processor;
 determining that no match of the item or a substitute for the item is found; and
 in response to no match of the item or a substitute for the item being found, identifying one or more related items.

4. A method of implementing item-specific money transfers as in claim 1, further comprising providing a price comparison interface to one or more of the following: the sender, the receiver, or vendor.

5. A method of implementing item-specific money transfers as in claim 4, wherein the price comparison interface is configured to search one or more of the following: a database of items or substitutes for the items for the identified item or a substitute for the item, and display price comparisons for the identified item or a substitute for the item from other vendors.

6. A method of implementing item-specific money transfers as in claim 5, receiving, from the sender or the receiver, a selection of the item or a substitute for the item from one of the other vendors.

7. A method of implementing item-specific money transfers as in claim 6, in response to the selection, adjusting the amount of the money transfer to the price of the item or a substitute for the item from the one of the other vendors.

8. A method of implementing item-specific money transfers as in claim 1, wherein the item or a substitute for the item comprises a charitable donation.

9. A method of implementing item-specific money transfers as in claim 8, further comprising in response to the item or a substitute for the item comprising a charitable donation, sending to the sender a tax statement related to the charitable donation.

10. A method of implementing item-specific money transfers as in claim 1, wherein the restricted use of the funds is restricted based in part on the Universal Product Code (UPC) associated with the item or a substitute for the item.

11. A method of implementing item-specific money transfers as in claim 10, wherein the funds from the money transfer are sent to a mobile wallet of the receiver.

12. A method of implementing item-specific money transfers as in claim 11, wherein the funds in the mobile wallet are restricted to purchase the item or a substitute for the item associated with the UPC.

13. A non-transitory computer-readable medium having sets of instructions which, when executed by a computer, cause the computer to:
 receive identifiers of an item or a substitute for the item, wherein the identifiers of the item is a barcode and a photograph of the item;
 determine a vendor and a price of the item or a substitute for the item;
 receive, from a receiver, a money transfer request for an amount of the price of the item or a substitute for the item, wherein the money transfer request identifies a sender;
 send the money transfer request to the sender;
 receive, from the sender, authorization for a money transfer in an amount of the price of the item or a substitute for the item, wherein the authorization includes an indication that funds from the money transfer are restricted for use only for the item or a substitute for the item;
 pre-stage the money transfer;
 bind the funds of the money transfer to the item using the identifiers of the item, wherein the binging includes:
  associating the identifiers including the barcode of the item and the photograph of the item with the funds of the money transfer,
  generating a personal identification number (PIN) associated with the funds of the money transfer,
  providing access to the funds of the money transfer using the PIN which is bound to the funds of the money transfer, and
  based on the barcode of the item and the photograph of the item and by using the PIN, restricting the funds from the money transfer to only be used for payment to the vendor for the item or a predetermined substitute for the item;
 providing the identifiers and the PIN to the vendor of the item; and in response to the providing of the identifiers and the PIN to the vendor, release to the vender of the item or a substitute for the item, the money transfer for payment of the item or the predetermined substitute for the item.

* * * * *